Nov. 17, 1942.  W. F. ALLER  2,302,089
VALVE
Filed May 27, 1941
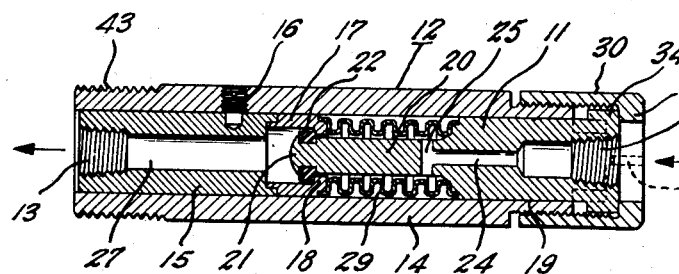
Fig. 1.
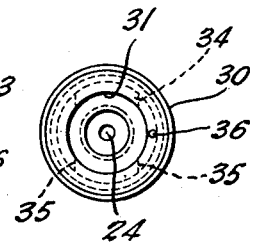
Fig. 2.
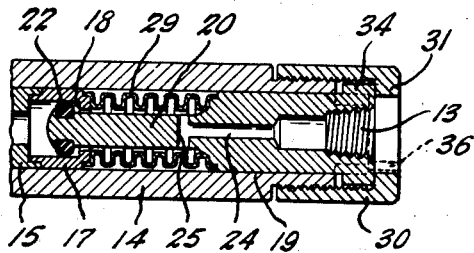
Fig. 3.
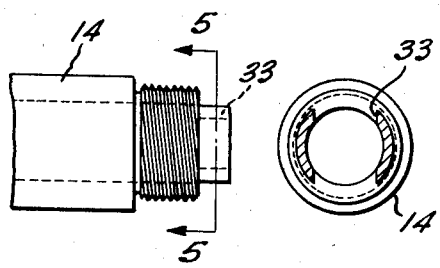
Fig. 4.   Fig. 5.
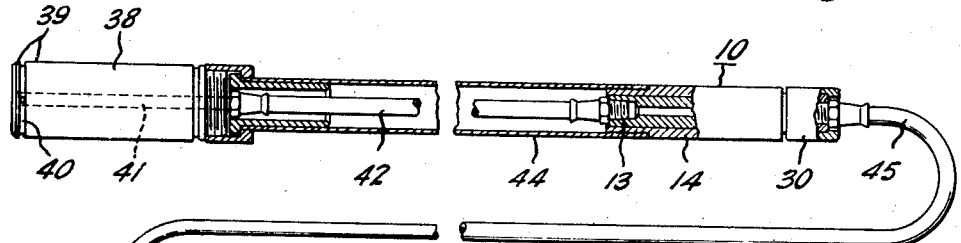
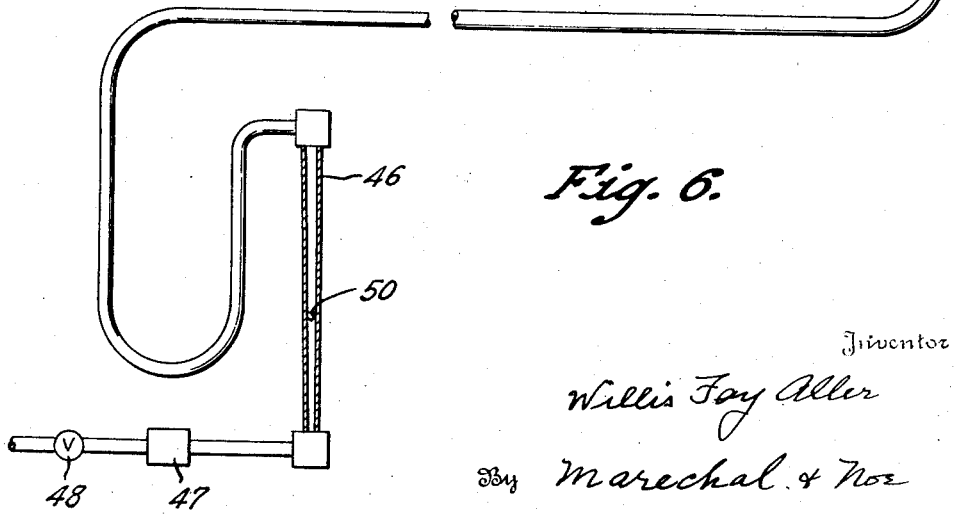
Fig. 6.
Inventor
Willis Fay Aller
By Marechal & Noe
Attorney Patented Nov. 17, 1942

2,302,089

UNITED STATES PATENT OFFICE 2,302,089

VALVE

Willis Fay Aller, Dayton, Ohio, assignor to The Sheffield Corporation, Dayton, Ohio, a corporation of Ohio Application May 27, 1941, Serial No. 395,439

7 Claims. (Cl. 251—8)

This invention relates to valves, the principal object of the invention residing in the provision of a valve adapted to control flow of fluid from a supply passage to a discharge passage and arranged so that the valve is closed with a force dependent upon the supply pressure, the valve also incorporating a flexible metal bellows which is subjected to the pressure of the fluid supply and which positively seals the valve against leakage.

Another object of the invention is the provision of a valve of compact construction, having a metal bellows which seals the valve inlet passage to the valve discharge passage against loss of fluid therefrom, there being provision for manually opening the valve, closing movement of the valve being entirely dependent upon the pressure of the supply fluid, which is continuously exerted on the bellows.

Other objects and advantages of the invention will be apparent from the following description, the appended claims and the accompanying drawing.

In the drawing,

Fig. 1 is a longitudinal section through a valve embodying the present invention;

Fig. 2 is an end view of the valve;

Fig. 3 is a sectional view through a portion of the valve shown in its open position;

Fig. 4 is a detail of an end portion of the valve body;

Fig. 5 is a section on the line 5—5 of Fig. 4; and

Fig. 6 is a view of a gaging device in which the valve is incorporated.

Referring more particularly to the drawing, in which the preferred embodiment of the invention has been shown, and in which similar parts have been designated by the same reference numerals in the several views, 10 generally designates a valve adapted to control the flow of fluid from a supply pipe which may be secured to the valve inlet member 11, to a discharge pipe which may be secured to the body member 12, these members having pipe threads 13 which receive the ends of the pipes to which the valve is connected.

The body member 12 through which the fluid is discharged from the valve is of generally cylindrical form, and comprises a shell 14 having a cylindrical bore which receives a sleeve 15, these two parts being held in their assembled relation by means of a set screw 16 passing through a hole in the shell 14 and threaded in the sleeve 15. Fixed to the sleeve 15 as by means of a sweated joint which forms a positive seal against the loss of fluid is a valve seat member 17 providing a valve seat 18.

The inlet member 11 is provided with a cylindrical surface 19 which is guided for axial movement in the shell 14, and is provided with a stem portion 20 carrying the valve closure 21. The valve closure preferably comprises a ring of hard rubber 22 held in position by peening over the end of the stem. An axial passage 24 in the inlet member is provided with lateral branch passages 25 so that fluid supplied to the inlet member can pass through the valve opening past the valve closure when the latter is open and flow to the discharge passage 27 in the body member. As will be apparent, if the inlet member is moved bodily towards the left as viewed in Fig. 1, the valve closure 21 will be moved away from the valve seat, and when the inlet member 11 is moved to the right, the valve will close.

To avoid any possibility of leakage from the inlet and discharge passages of the valve, the inlet and discharge portions of the valve, one providing a valve seat and the other providing a valve closure member, are connected together by means of a flexible metal bellows 29, one end of which is brazed to the inlet member 11 and the other end of which is brazed to the valve seat member 17 of the body member so that there can be no possibility of leakage between the part 17 and the parts 17 and 15. As will be apparent, the inside of the bellows is constantly subjected to the pressure of the fluid supply to the inlet member, and since the cross sectional area of the bellows considerably exceeds the cross sectional area of the valve opening at the valve seat, the supply pressure produces a closing force on the valve which is proportionate to the pressure of the supply. With a greater supply pressure productive of a greater tendency to leakage between the valve seat and closure, the closure will be held more tightly against the seat, and with a lower supply pressure, with resultant reduction in leakage tendency past the closure, a lesser closing force will be exerted.

For positively opening the valve at the desire of the operator, an operating sleeve 30 is threaded on the end of the body member 14 by means of threads of comparatively large lead, the sleeve 30 having a flange 31 which extends over the end of the inlet member 11, in abutting relation therewith and effective to move the member 11 towards the left as viewed in Fig. 1—that is, towards the discharge passage of the valve, to produce opening movements of the valve as the sleeve 30 is screwed inwardly along the body member 14. The operating means 30—31, however, are ineffective to create any direct closing force on the valve so the valve closure can not be jammed with an excessive force against the valve seat, the closing action of the valve taking place automatically in accordance with the pressure of the fluid supply.

The outer end of the body member 14 is slotted as indicated at 33 in Figs. 4 and 5, the slotted portion receiving the radial flange portions 34 on the inlet member 11 so that relative axial movements of these parts can take place although the inlet member is held against rotation in the body member 14. At the outer end of the inlet member 11 the latter is provided with flat sides 35 one of which cooperates with a pin 36 fixed in the flange 31 and projecting past the end of the inlet member. The flat side 35 on the inlet member permits about one-quarter of a revolution of the sleeve 30 before its pin 36 is brought up into engagement with the flat side 35 of the flange portion 34. The lead of the threads connecting the sleeve 30 and the body member 14 is sufficient to produce enough axial travel of the closure, from its seated position, merely by turning the sleeve 30 a comparatively small part of a revolution. The pin 36 is preferably arranged between the two flanged portions 34 when the valve is closed.

Fig. 6 shows the valve 10 incorporated in a gaging device adapted to gage a workpiece and having measuring means which is responsive to the rate of flow of leakage fluid between a gaging element and the workpiece. The gaging device includes a gaging element 38 shown in the form of a plug adapted to interfit a bore or hole in a workpiece to be gaged, the gaging element 38 having spaced gaging surfaces 39 separated by a channel 40 which is supplied with fluid such as air under pressure, through the passage 41 leading to a hose 42. The hose is connected to the discharge member 14 of the valve 10. The discharge member 14 is also provided with screw threads 43 engaging the threaded end of a rigid tube 44, the opposite end of the tube being fixed to the gaging element 38 so that the tube, the valve and the gaging element are arranged in alignment with one another and are rigidly connected together, permitting the gaging element to be inserted in a long passage the diameter of which is to be checked or compared with a workpiece of standard size. The inlet member 11 of the valve is connected to a long flexible rubber tube 45 which extends to a rate of flow measuring device 46 which is supplied with air or other fluid, under pressure, from an adjustable pressure regulating valve 47 connected through a shut-off valve 48 to a suitable pressure source.

The measuring device 46, as shown, is a vertical transparent tube with a tapering cross sectional internal area and containing a longitudinally movable element 50 which assumes different heights along the tube dependent upon the rate of flow of fluid through the tube so that the height of the element 50 gives an indication of the rate of fluid flow. The lower end of the tube, which is of smaller cross sectional area than the upper end, is in free communication with the discharge side of the pressure regulating valve and the upper end of the tube is in free communication through the hose 45 with the inlet member of the valve, the valve being employed by the operator to prevent loss of fluid when he withdraws the gaging element from the work. After he inserts the gaging element in the work, it is a simple matter for him to turn the sleeve 30 to cause positive opening of the valve and thus permit flow of fluid through the leakage path provided by the gaging element and the work, and by comparing the height of the measuring part 50 with its height when the gaging element is inserted in a workpiece of standard size, he can readily determine the size of the gaged part or determine the approximate error present. As no substantial restrictions are provided in the flow path from the pressure regulating valve to the gaging element when the valve 10 is open, the measuring device is almost instantaneous in its action. As all the connections are perfectly fluid-tight between the pressure regulating valve and the gaging element and as the valve 10 incorporates a sealing construction so that the operator is assured there can be no possibility of leakage from the system except that which takes place at the gaging element, the indications given by the measuring device will always be reliable. It will be apparent that if the usual packed joints were present in the valve 10 there could be a leakage from the valve itself as well as from the gaging element at the time an indication is being read on the measuring device and the indications of the latter would then be inaccurate, but the errors produced by a valve with packed joints are completely avoided in accordance with the present invention.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A valve of the character described comprising an inlet portion having an inlet passage, a discharge portion having a discharge passage, a flexible metal bellows sealing the inlet passage to the discharge passage against loss of fluid therefrom and connecting the inlet and outlet portions one to another for relative axial movement, said discharge portion having a valve seat, a closure member operable against the seat in a direction axially of the bellows and having connection to one end of the bellows, manually operable means for positively moving the closure member away from its seat but ineffective to exert any direct closing force on the closure member, said bellows having a cross sectional area considerably exceeding the area of the valve seat opening and having constant communication with the inlet passage to normally apply a closing force on the closure member proportionate to the pressure in the inlet passage.

2. A valve of the character described comprising an inlet member having a supply passage, a discharge member having a discharge passage, a flexible metal bellows sealed at one end to the inlet member and sealed at the other end to the discharge member and connecting said members for relative axial movement, means placing the interior of said bellows in constant communication with the supply passage of the inlet member, one of said members having a valve seat and the other member having a closure movable away from the seat upon collapsing movement of the bellows and normally yieldingly held in seated position by the pressure exerted by the bellows, the cross sectional area of the bellows exceeding the effective area of the valve seat.

3. A valve of the character described comprising an inlet member having a supply passage, a discharge member having a discharge passage, a flexible metal bellows sealed at one end to the inlet member and sealed at the other end to the discharge member and connecting said members for relative axial movement, means placing the interior of said bellows in constant communication with the supply passage of the inlet member, one of said members having a valve seat and the other member having a closure movable away from the seat upon collapsing movement of the bellows, the cross sectional area of the bellows considerably exceeding the area of the opening of the valve seat so the closing pressure exerted by the bellows increases in proportion to increase of supply pressure, and means for positively exerting a collapsing movement on the bellows.

4. A valve of the character described comprising an inlet member having a supply passage, a discharge member having a discharge passage substantially in axial alignment with the supply passage, a flexible metal bellows sealed at one end to the inlet member and sealed at the other end to the discharge member and connecting said members for relative axial movement, means placing the interior of the bellows in constant communication with the supply passage of the inlet member, one of said members having a valve seat of smaller effective area than that of the bellows and also having a shell portion enclosing the bellows and guiding the other member, and such other member having a closure separable from the seat upon collapsing movement of the bellows and normally yieldingly held in seated position in accordance with the pressure exerted by the bellows.

5. A valve of the character described comprising an inlet member having a supply passage, a discharge member having a discharge passage, means guiding one of said members on the other for relative axial movement, a flexible metal bellows connected at its opposite ends in sealed relation to said respective members, a valve stem axially movable in said bellows and fixed to one of said members, said stem having a valve closure, the other member having a valve seat engaged by said valve closure upon relative movement of said members away from one another, said seat having an effective area less than that of the bellows said inlet member having means placing its supply passage in constant communication with the inside of the bellows to provide a valve closure force proportionate to the supply pressure.

6. A valve of the character described comprising a substantially cylindrical body member having a valve seat and having a substantially axially extending discharge passage, an inlet member axially guided in said body member and having an axially extending supply passage and having means for attachment to a supply pipe, a closure cooperating with the valve seat, a stem rigidly securing the closure to the inlet member, a flexible metal bellows in said body member and having an effective area greater than that of the valve seat, said bellows having a sealed connection at one end thereof to said body member and a sealed connection at the other end thereof to said inlet member and sealing the supply passage to the discharge passage against loss of fluid therefrom, said bellows having constant communication with the supply passage and acting normally to hold the closure member against the seat with a force determined by the pressure supplied to the bellows, a sleeve threaded on said body member and having a shoulder abutting against the end of the inlet member and adapted for manual rotation to positively force the inlet member towards the discharge passage and thus open the valve but ineffective to exert direct pressure on the inlet member in such direction as to close the valve, and means for limiting the rotational movements of the sleeve to less than a complete turn on the body member.

7. A valve adapted to control the passage of fluid from a flow measuring device to a gaging element comprising a body member having means for securing it to the gaging element, an inlet member slidably guided in said body member and having means for connecting it to the flow measuring device, said members having aligned passages for the discharge and supply of fluid respectively, a flexible metal bellows secured at one end to the body member and at its other end to the inlet member and forming a pressure tight seal with such members between said discharge and inlet passages, said bellows having constant communication with said inlet passage, one of said members having a valve seat and the other having a valve closure of less effective area than that of the bellows and operable against the seat by expansion of the bellows with a force proportionate to the pressure of the fluid supply, and manually operable means carried by the body member and in abutting relation with the inlet member to positively move the valve closure away from the seat but ineffective to move the inlet member in such direction as to close the valve.

WILLIS FAY ALLER,